United States Patent [19]

Guzman et al.

[11] 3,871,979

[45] Mar. 18, 1975

[54] NEW PHOTOCHEMICAL PROCESS FOR PRODUCING 9-OXYGENATED-11α-HYDROXYMETHYL-15α-HYDROXYPROSTA-5-CIS,13-TRANS-DIENOIC ACIDS

[75] Inventors: Angel Guzman, Mexico D.F., Mexico; Michael Marx, Cupertino, Calif.

[73] Assignee: Syntex (U.S.A.) Inc., Palo Alto, Calif.

[22] Filed: Mar. 1, 1974

[21] Appl. No.: 447,323

[52] U.S. Cl. .......................................... 204/158 R
[51] Int. Cl. ........................................... B01j 1/10
[58] Field of Search ................................ 204/158 R

[56] References Cited
UNITED STATES PATENTS 3,514,383   5/1970   Beal et al. .................... 204/158 R
3,759,978   9/1973   Lincoln et al. ................ 204/158 R Primary Examiner—Howard S. Williams
Attorney, Agent, or Firm—Gerard A. Blaufarb; Leon Simon; William B. Walker

[57] ABSTRACT

New process for the production of 8R-antimeric and racemic 9-oxygenated-11α-hydroxymethyl-15α-hydroxyprosta-5-cis,13-trans-dienoic acids in which the key step comprises the sensitized irradiation of natural $PGA_2$ methyl ester or its racemate in methanol solution, in the presence of benzophenone or another sensitizing agent, preferably at a wavelength of about 360 m$\mu$.

7 Claims, No Drawings

NEW PHOTOCHEMICAL PROCESS FOR PRODUCING 9-OXYGENATED-11α-HYDROXYMETHYL-15α-HYDROXYPROSTA-5-CIS,13-TRANS-DIENOIC ACIDS

The present invention relates to a novel process for producing prostaglandin derivatives.

More particularly, this invention relates to a new process for producing 8R-antimeric and racemic 11α-hydroxymethyl derivatives of 9-keto -15α-hydroxy and 9ξ, 15α-dihydroxyprosta-5-cis,13-trans-dienoic acids.

Prostaglandins are members of a relatively new hormonal system which are widely distributed in human and animal tissues and possess a remarkable range of biological and pharmaceutical properties. These compounds belong to a group of chemically related 20 carbon chain hydroxy fatty acids containing a five membered ring in the structure and different degrees of unsaturation, a number of which has been reported in the literature. For a review on prostaglandins and the definition of primary prostaglandins see, for example S. Bergström, *Recent Progress in Hormone Research* 22, pp 153–175 (1966) and *Science*, 157 page 382 (1967) by the same author.

Naturally occuring prostaglandins have been isolated from mammal sources in very small amounts. In addition, a number of the natural occurring prostaglandins as well as the corresponding racemic compounds have been prepared by chemical synthesis; note, for example, E. J. Corey et al, *J. Am. Chem. Soc.*, 91, p. 5675(1969); *J. Am. Chem. Soc.*, 92 p. 2586 (1970) and *J. Am. Chem. Soc.*, 93, pages 1489–1493 (1971) and references cited therein, W. P. Schneider et al, *J. Am. Chem. soc.*, 90, p. 5895 (1968); U. Axen et al, *Chem. Commun.*, page 303 (1969) and W. P. Schneider, *Chem. Commun.*, page 304 (1969).

It is also been reported by A. J. Weinheimer et al. [Tetrahedron Letters, 5183 (1969)] that a type of coral, the sea whip or sea fan Plexaura homomalla (Esper found in reefs off the Florida coast, in the Caribbean region, contains high concentrations of prostaglandin derivatives of the $PGA_2$ series, to which they assigned the unnatural (R) configuration for the hydroxyl group at C-15. More recently, W. P. Schneider et al, [*J. Am. Chem. Soc.*, 94, 2122 (1972)] reported that some forms of P. homomalla contain, instead of the (15R) prostaglandins, esterified derivatives of (15S)- $PGA_2$ and (15S)-$PGA_2$, identical with the prostaglandins derived from mammalian sources. They also found that some specimens of this gorgonian may contain both (15R) and (15S) prostaglandins.

Molecules of known prostaglandins have several asymmetric centers and therefore can exist in the form of racemic mixtures or as individual, optically active antimers.

The antimeric, optically active compounds corresponding to prostaglandins obtained from natural sources are the 8R-antimers.

The use of the symbol "R" preceding a substituent designates the absolute stereochemistry of that substituent according to the Cahn-Ingold-Prelog rules [see Cahn et al., *Angew. Chem. Inter. Edit.*, Vol. 5, p. 385 (1966), errata p. 511; Cahn et al., *Angew. Chem.*, Vol. 78, p. 413 (1966); Cahn and Ingold, *J. Chem. Soc.*, (London), 1951, p. 612; Cahn et al., *Experientia*, Vol. 12, p. 81 (1956); Cahn., *J. Chem. Educ.*, Vol. 41, p. 116 (1964)]. Because of the interrelation of the designated substitutent with the other subtituents in the compound having α or β prefixes, the designation of the absolute configuration of one substituent fixes the absolute configuration of all substituents in the compound and thus the absolute configuration of the compound as a whole.

Because of the remarkable range of biological and pharmacological properties exhibited by this family of compounds a great deal of interest has focused upon such compounds and the preparation of analogs of such compounds.

In copending patent application Ser. No. 444,689, filed Feb. 21, 1974 of Guzman and Muchowski, there was described a multistage process for producing 8R-antimeric and racemic 11α-hydroxymethyl-9-keto-15α-hydroxyprosta-5-cis,13-trans-dienoic and 9ξ, 15α-dihydroxyprosta-5-cis,13-trans-dienoic acids as well as certain derivatives thereof using as starting material 8-R-9-keto-11α-nitromethyl-15α-hydroxyprosta-5-cis,13-trans-dienoic acid methyl ester of the corresponding racemic compound, which in turn are obtained by treatment of natural $PGA_2$ methyl ester or its racemate with nitromethane in the presence of Triton B, as described by C. V. Grudzinskas et al., in *Tetrahedron Letters* No. 2, 141 (1973).

In accordance with the present invention we have discovered a new and simple process for producing said 8R-antimeric and racemic 11α-hydroxymethyl prostaglandin derivatives. The key step of the process hereof comprises the sensitized irradiation of natural $PGA_2$ methyl ester (8R-9-keto-15α-hydroxyprosta-5-cis, 10,13-trans-trienoic acid methyl ester) or its racemate to introduce in a single step the hydroxymethyl group at c-11. Upon reduction of the 9-keto group there are produced the 9-hydroxylated derivatives. This process is illustrated by the following reaction scheme:

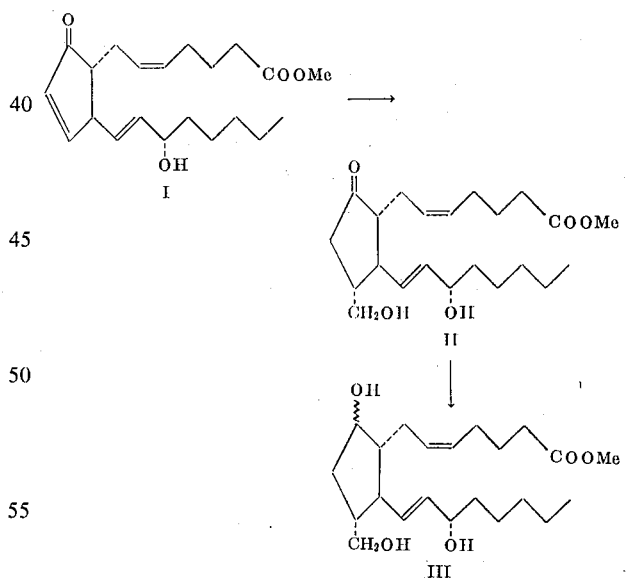

In the above formulas, the dotted lines indicate that the substituents are in α configuration, i.e., below the plane of the cyclopentane ring. The double bonds at C-5,6 and C-13,14 have the same configuration as in natural prostaglandins of the $PGE_2$ and $PGF_2$ series, i.e., the double bond at C-5,6 is in cis configuration and the double bond at C-13,14 is in trans configuration. The wavy line ξ in formula III indicates the α or β configuration or mixtures thereof.

As drawn, formulas I to III each represent the particular optically active form corresponding to natural prostaglandins, (8R-antimeric compounds). However, it is to be understood that the mirror images for the racemic mixtures are encompassed thereby.

In practicing the process illustrated above, 8R-9-keto-15α-hydroxyprosta-5-cis, 10, 13-trans-trienoic acid methyl ester (natural PGA$_2$ methyl ester) or the racemic compound thereof (compounds of Formula I), are submitted to sensitized irradiation in methanol solution in the presence of a sensitizing agent, particularly in the presence of benzophenone, and under an inert atmosphere, e.g., nitrogen, argon and the like, to yield the hydroxymethyl compound of formula II.

Typically, this reaction is effected in very dilute solutions, i.e., using from about 120 to 600 parts of methanol per part of starting compound I (volume to weight ratio) and from 0.1 to 0.5 molar equivalents of the sensitizing agent. The amount of methanol used depends upon the amount of starting compound to be irradiated, greater amounts being required when using larger amounts of starting material. The reaction mixture placed in a Pyrex vessel of an irradiation apparatus is deaerated by passing through it a stream of nitrogen for about 15 minutes, and thereafter, it is irradiated at a wavelength of about 320 to 400μ, particularly at 360μ, with continuous bubbling of nitrogen through the reaction mixture. This photochemical reaction is effected at about room temperature, for a period of time of the order of 4 to 10 hours, preferably for about 6 hours, using particularly a germicidal lamp such as GE lamp F 4T5-BLB. However, other sources of ultraviolet light within the above-mentioned ranges can also be used. The course of the reaction can be followed by periodic determination of the ultraviolet spectrum, interrupting the irradiation when the intensity of the absorption at 217 μ is reduced to about 1/10–1/20 of the original intensity.

When the reaction is essentially complete, the product is isolated from the reaction mixture by evaporation of the solvent and purification of the residue by chromatographic techniques, preferably by preparative thin layer chromatography on silica gel, using ethyl acetate containing traces of methanol as eluant.

Alternative sensitizing agents used in this reaction are alkyl substituted benzophenones such as ortho, meta or para-methylbenzophenones or lower alkyl phenyl ketones in which the alkyl group contains 1 to 5 carbon atoms, e.g., acetophenone, propiophenone, butyrophenones and the like.

In the preferred embodiments, this reaction is conducted using about 160 to 400 parts of methanol per part of PGA$_2$ methyl ester (volume /weight) and about 0.3 molar equivalents of benzophenone as sensitizing agent, at a wavelength of 360 μ, for about 6 hours. There are obtained yields of the order of 20 to 30 percent.

The 9-keto group in the 8R-antimeric or racemic compounds of formula II is then reduced to a hydroxyl group using particularly sodium borohydride in methanol solution at about 0°c, obtaining a mixture of the corresponding 9α and 9β-hydroxy isomers, (compounds of formula III) which are separated by chromatographic techniques.

The methyl ester compounds of formulas II and III can be converted into the corresponding free prostadienoic acids by the hydrolysis methods known in the prostaglandin art, e.g., by saponification with sodium hydroxide or potassium carbonate in aqueous methanol, or with sodium hydroxide in aqueous tetrahydrofuran [F. S. Alvarez et al, *J. Am. Chem. Soc.* 94, 7823 (1972)], or by enzymatic methods using for example a crude hog pancreateic lipase (A. F. Kluge et al., *J. Am. Chem. Soc.*, 94, 782 (1972) or the enzymes contained in the cortex of the gorgonian *Plexaura homomalla* (Esper). as described by A. Prince et al., in *Prostaglandins*, Vol. 3 No. 4 p. 531 (1973). The free acids can be converted into pharmaceutically acceptable salts by conventional methods.

Compounds of formulas II and III can also be converted into other useful 11α-hydroxymethyl prostaglandin derivatives, as described in the aforementioned patent application, i.e., the double bond at C-5,6 can be selectively hydrogenated to produce the C-13,14-monounsaturated compounds, a lower alkyl group at C-15 can be introduced, etc.

The starting materials of formula I are obtained as follows: 8R-9-keto-15α-hydroxyprosta-5-cis, 10,13-trans-trienoic acid methyl ester (natural PGA$_2$ methyl ester) is obtained from the gorgonian *Plexaura homomalla* (Esper) [W. P. Schnedier et al, *J. Am. Chem. Soc.*, 94, 2122 (1972)]. The racemic compound is obtained by dehydration of 9-keto- 11α, 15α-dihydroxyprosta-5-cis, 13-trans-dienoic acid, described by E. J. Corey et al., in *J. Am. Chem. Soc.*, 91, 5675 (1969) with 90% aqueous acetic acid, in accordance with the method of J. E. Pike et al., *J. Org. Chem.*, 34, 3552 (1969) followed by conventional esterification of the carboxylic acid function with ethereal diazomethane.

When starting from natural PGA$_2$ methyl ester the products obtained are 8R-antimers while starting from racemic PGA$_2$ methyl ester the products obtained are racemates.

The 11α-hydroxymethyl compounds obtained by the process of the present invention exhibit prostaglandin-like biological activities and thus are useful in the treatment of mammals where the use of prostaglandins is indicated. Thus, they are bronchodilators and therefore are useful in treating mammals for bronchial spasm or wherever strong bronchodilators are indicated. These compounds are also useful in controlling or palliating hypertension in mamals and further exhibt central nervous system depressant activity in mammals, and are useful as sedatives. In addition, the compounds are useful for inducing labor, in pregnancy, and for inducing menses to correct or reduce menstrual abnormalities.

These compounds can be administered in a wide variety of dosage forms, either alone or in combination with other pharmaceutical compatible medicaments, in the form of pharmaceutical compositions suited for oral or parenteral administration or inhalation in the case of bronchodilators. The compounds are typically administered as pharmaceutical compositions consisting essentially of the compounds and a pharmaceutical carrier. The pharmaceutical carrier can be either a solid material, liquid or aerosol, in which the compound is dissolved, dispersed or suspended, and can optionally contain small amounts of preservatives and/or pH-buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solutions, emulsions, suspensions, syrups, or elixirs. The solid compositons can take the form of tablets, powders, capsules, pills or the like, preferably in the unit dosage forms for simple administration or precise dosages. Suitable solid carriers include, for example, pharmaceutical grades of starch, lactose, sodium saccharin, talcum, sodium bisulfite and the like.

For inhalation adminstration, the compounds can, for example, be administered as an aerosol comprising the compounds in an inert propellant together with a cosolvent e.g., ethanol, together with optional preservatives and buffering agents. Additional general information concerning the inhalation administration of aerosols can be had by reference to U.S. Pat. Nos. 2,868,691 and 3,095,355.

The 11α-hydroxymethyl prostaglandins are typically administered in dosages of about from 0.01 to 10 mg. per Kg. of body weight. The precise effective dosage will, of course, vary depending upon the mode of administration, condition being treated and host. The following Examples illustrate the invention, but are not intended to limit its scope. The abbreviation t.l.c. refers to thin-layer chromatography and all mixture ratios used with regard to liquids refer to volume ratios. Also, where necessary, examples are repeated to provide sufficient starting material for subsequent examples.

EXAMPLE 1

To a solution of 250 mg. of 8R-9-keto-15α-hydroxyprosta-5-cis, 10,13-trans-trienoic acid methyl ester (Ester) and purified by successive chromatographies, first on a Florisil column using increasing percentages of ether in methanol and thereafter by thin-layer chromatography on silica gel. using methylene chloride-ethyl acetate (95:5) as gradient] in 40 ml. of anhydrous methanol, placed into a Pyrex vessel of an irradiation apparatus are added 30 mg. of benzophenone. Nitrogen is then bubbled through the resulting mixture for 15 minutes, and thereafter it is irradiated at 360 μ for 6 hours using a G.E. germicidal lamp F 4T5-BLB. At the end of this time the reaction is essentially complete as demonstrated by the substantial extinction of the ultraviolet absorption at 217 μ. The reaction mixture is then evaporated to dryness under reduced pressure and the rsidue purified by t.l.c. using ethyl acetate-methanol (99.5:0.5) as eluant, thus yielding 63 mg. of the pure 8R-9-keto-11α-hydroxymethyl-15α -hydroxyprosta-5-cis, 13-trans-dienoic acid methyl ester.

In a similar manner, starting from 9-keto-15α-hydroxyprosta-5-cis, 10,13-trans-trienoic acid methyl ester there is obtained 9-keto-11α-hydroxymethyl-15α-hydroxyprosta-5-cis, 13-trans-dienoic acid methyl ester in a similar yield.

EXAMPLE 2

Example 1 is repeated but using equivalent amounts of acetophenone, butyrophenone or p-methylbenzophenone in place of benzophenone, obtaining in each case 8R-9-keto-11α-hydroxymethyl-15α-hydroxyprosta-5-cis, 13-trans-dienoic acid methyl ester.

EXAMPLE 3

To a solution of 100 mg. of 8R-9-keto-11α-hydroxymethyl-15α-hydroxyprosta-5-cis, 13-trans-dienoic acid methyl ester in 5 ml. of methanol, cooled to 0°C, are added 25 mg. of sodium borohydride, and the reaction mixture is stirred for 30 minutes at 0°C. The solvent is then eliminated under reduced pressure, water is added and the product extracted with methylene chloride. The organic extract is washed with dilute acetic acid solution and water to neutral, dried over magnesium sulfate and evaporated to dryness under reduced pressure. The residue is purified by thin layer chromatography, using ethyl acetate-methanol (99.5: 0.5) as eluant, to afford 8R-11α-hydroxymethyl-9α, 15α-dihydroxyprosta-5-cis, 13-trans-dienoic acid methyl ester and 8R-11α-hydroxymethyl-9β, 15α-dihydroxyprosta-5-cis, 13-trans-dienoic acid methyl ester in pure form.

By the same method, 9-keto-11α-hydroxymethyl-15α-hydroxyprosta-5-cis, 13-trans-dienoic acid methyl ester is converted into 11α-hydroxymethyl-9α, 15α-dihydroxyprosta-5-cis,13-trans-dienoic acid methyl ester and the 9β-hydroxy isomer.

EXAMPLE 4

Twenty milligrams of 8R-9-keto-11α-hydroxymethyl-15α-hydroxyprosta-5-cis,13-trans-dienoic acid methyl ester are dissovled in a mixture of 2 ml. of methanol, 2 ml. of water and 90 mg. of potassium carbonate. The reaction mixture is maintained at 40°C for 16 hours under nitrogen atmosphere, 10 ml. of water are then added, and the reaction mixture is evaporated under reduced pressure to half volume. It is then acidified with 2N hydrochloric acid and extracted several times with ethyl acetate. The combined extracts are dried over magnesium sulfate and evaporated to dryness under reduced pressure, obtaining 8R-9-keto-11α-hydroxymethyl-15α-hydroxyprosta-5-cis, 13-trans-dienoic acid.

In a similar manner 9-keto-11α-hydroxymethyl-15α-hydroxyprosta-5-cis, 13 -trans-dienoic acid and 8R-11αhydroxymethyl-9α, 15α-dihydroxyprosta-5-cis, 13-trans-dienoic acid are obtained from the corresponding methyl esters.

What is claimed is:

1. A process for introducing a hydroxymethyl group at the C-11α-position in 8R-9-keto-15α-hydroxyprosta-5-cis, 10, 13-trans-trienoic acid methyl ester or its racemate, which comprises irradiating said PGA$_2$ methyl ester compound in dilute methanol solution in the presence of a sensitizing agent, at a wavelength of about 320 to 400 μ, for a period of time of the order of 4 to 10 hours under an inert atmosphere, thereby yielding 8R-9-keto-11α-hdyroxymethyl-15α-hydroxyprosta-5-cis, 13-trans-dienoic acid methyl ester or the racemic compound thereof.

2. The process of claim 1 wherein there are used from 120 to 500 parts of methanol per part of starting compound.

3. the process of claim 1 wherein there are used from 0.1 to 0.5 molar eqivalents of the sensitizing agent.

4. The process of claim 3 wherein the sensitizing agent used is selected from the group consisting of benzophenone, alkyl substituted benzophenones and lower alkayl phenyl ketones.

5. The process of claim 4 wherein there are used about 0.3 to 0.4 molar equivalents of benzophenone as sensitizing agent.

6. The process of claim 1 wherein the irradiation is effected at 360 μ for a period of time of 6 to 8 hours.

7. The process of claim 1 wherein the starting material used is 8R-9-keto-15α-hdyroxyprosta-5-cis, 13-trans-dienoic acid methyl ester isolated from the gorgonian *Plexaura homomalla* (Esper).

* * * * *

UNITED STATES PATENT OFFICE
CERTIFICATE OF CORRECTION

Patent No. 3,871,979                    Dated March 18, 1975

Inventor(s) Angel Guzman, Michael Marx

It is certified that error appears in the above-identified patent and that said Letters Patent are hereby corrected as shown below:

Column 1, line 40, "(Esper" should read --- (Esper) ---.
Column 2, line 32, "c-11" should read --- C-11 ---.  Column 3, line 23, "400 µ" and "360 µ" should read --- 400 mµ and 360 mµ ---.  Column 3, line 34, "217 µ" should read 217 mµ ---.
Column 3, line 52, "360 µ" should read --- 360 mµ ---.  Column 4, line 3, "pancreateic" should read --- pancreatic ---.
Column 4, line 66, "compositons" should read --- compositions ---.  Column 5, line 27, after the word ester insert --- [isolated from the gorgonian Plexaura homomalla ---.  Column 5, line 28, "(Ester)" should read --- (Esper) ---.  Column 5, line 37, "360 µ" should read --- 360 mµ ---.  Column 5, line 41, "217 µ" should read --- 217 mµ ---.  Column 5, line 42, "rsidue" should read --- residue ---.  Column 6, line 35, 11α hydroxymethyl" should read --- 11α-hydroxymethyl ---.  Comumn 6, Claim 1, line 45, "400 µ" should read --- 400 mµ ---.
Column 6, Claim 4, line 58, "alkayl" should read --- alkyl ---.
Column 6, Claim 6, line 63, "360 µ" should read --- 360 mµ ---.

Signed and Sealed this seventh Day of October 1975

[SEAL]

Attest:

RUTH C. MASON
Attesting Officer

C. MARSHALL DANN
Commissioner of Patents and Trademarks